United States Patent [19]

Korth et al.

[11] Patent Number: 5,399,094
[45] Date of Patent: Mar. 21, 1995

[54] DEVICE FOR DIGITAL DATA TRANSMISSION

[75] Inventors: Hans-Joachim Korth, Nordhorn; Clemens Voss, Neubörger, both of Germany

[73] Assignee: Stemmann-Technik GmbH, Schüttorf, Germany

[21] Appl. No.: 214,165

[22] Filed: Mar. 16, 1994

[30] Foreign Application Priority Data

Mar. 19, 1993 [DE] Germany .................. 43 08 735.3

[51] Int. Cl.⁶ ........................................... H01R 25/14
[52] U.S. Cl. ................................... 439/110; 439/111; 439/497; 174/117 F
[58] Field of Search ...................... 439/110–112, 439/586, 497, 492; 174/70 C, 97, 117 R, 117 F

[56] References Cited

U.S. PATENT DOCUMENTS 4,881,907 11/1989 Bergman et al. ............. 439/111

FOREIGN PATENT DOCUMENTS 4122469 8/1992 Germany .

Primary Examiner—Gary F. Paumen
Attorney, Agent, or Firm—Friedrich Kueffner

[57] ABSTRACT

A device for digital data transmission includes a U-shaped support rail and a plastic strand which can be clamped into the U-shaped support rail. A strip-like metal contact conductor is mounted on a portion of the inner side of the plastic strand located frontally opposite and at a distance from an insertion gap for a collector shoe which is longitudinally movable in the support rail. The contact conductor contacts a contact body of the collector shoe. Compared to the plastic strand, the contact conductor has a significantly smaller thickness. A shielding member is provided between the inner side of the plastic strand and the support rail. The shielding member has shield contact surfaces which interact with a contact piece of the collector shoe. The contact conductor is clamped into a longitudinal channel of the plastic strand which is bent into a circular shape. The plastic strand is locked to the support rail. With the exception of the shield contact surfaces, the shielding member is insulated relative to the inner side of the plastic strand. The shield contact surfaces are supported by outer edge portions of the plastic strand and project freely movably beyond projections at the sides of the support rail.

6 Claims, 3 Drawing Sheets

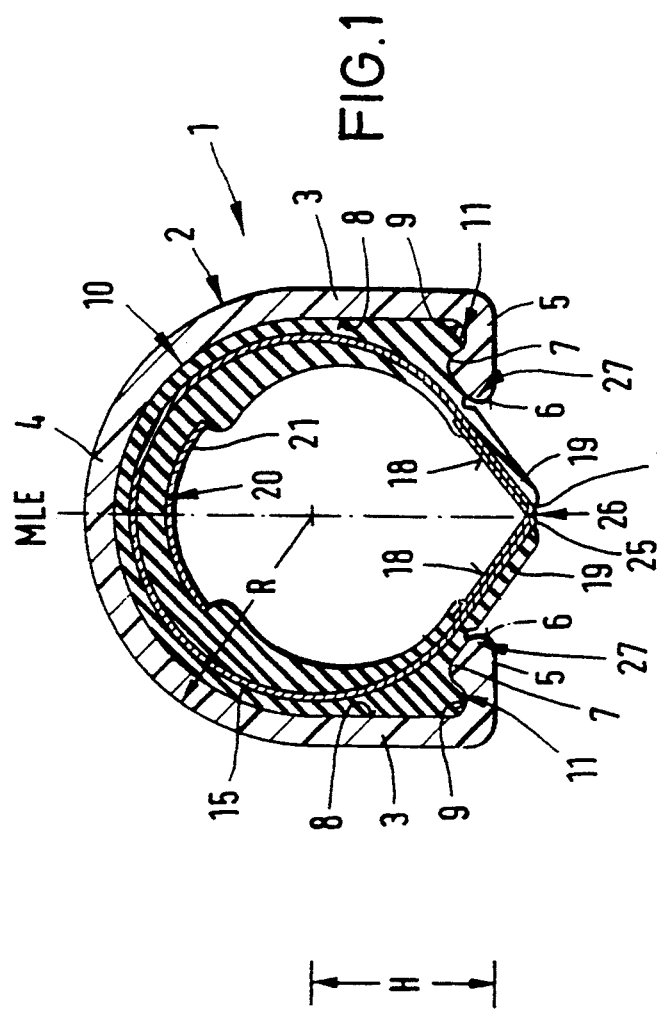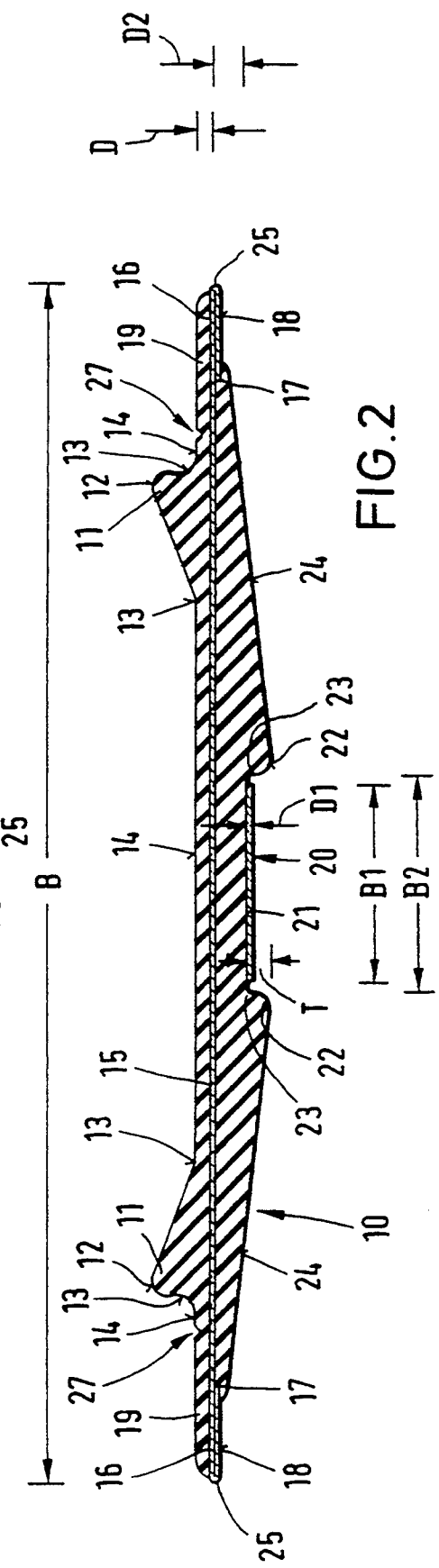
FIG.1
FIG.2

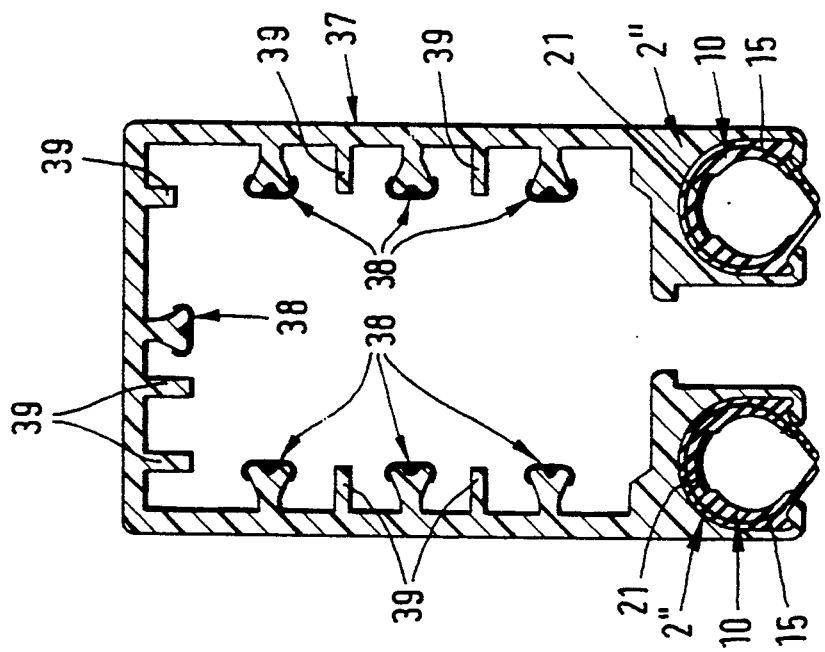
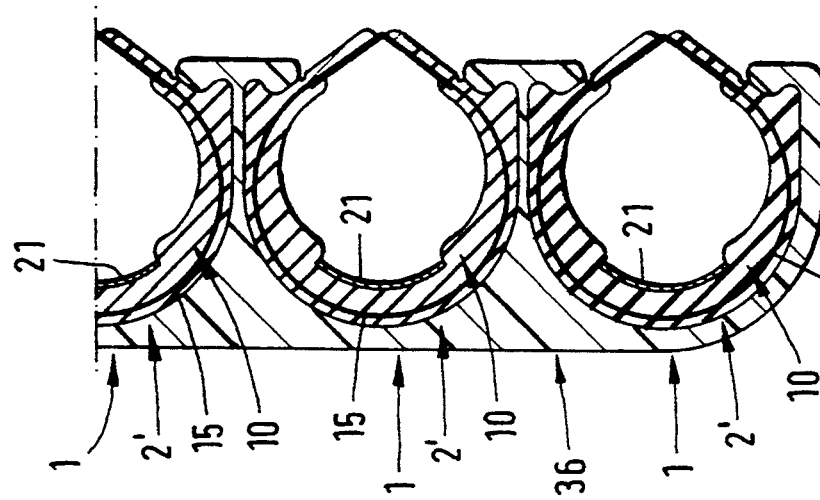

DEVICE FOR DIGITAL DATA TRANSMISSION

BACKGROUND OF THE INVENTION

1. Field of the Invention

The present invention relates to a device for digital data transmission with a U-shaped support rail and a plastic strand which can be clamped in a positively engaging manner into the U-shaped support rail. A strip-like metal contact conductor is mounted on a portion of the inner side of the plastic strand located frontally opposite and at a distance from an insertion gap for a collector shoe which is longitudinally movable in the support rail. The contact conductor contacts a contact body of the collector shoe. Compared to the plastic strand, the contract conductor has a significantly smaller thickness. A shielding member is provided between the inner side of the plastic strand and the support rail. In the area of the insertion gap, the shielding member has shield contact surfaces which interact with a contact piece of the collector shoe.

2. Description of the Related Art

A device of the above-described type is disclosed in German Patent 41 22 469. The device includes a plastic strand which, in the flat state thereof, has a thickness which is small as compared to its width. A narrow metal contact conductor is arranged on one side and in the middle of the plastic strand. The thickness of the contact conductor is significantly smaller than the thickness of the plastic strand. The plastic strand has on its other side a shielding member composed of a mesh. The shielding member engages in a clamp-like manner around the longitudinal edges of the plastic strand. Narrow shield contact surfaces for connecting the shielding member to ground through a mobile collector are provided on the outer sides of the short portions of the screening member engaging around the longitudinal edges of the plastic strand. Together with the contact conductor and the shielding member, the plastic strand is clamped into a U-shaped support rail of plastics material. For this purpose, the support rail has two sides which over the entire height thereof extend parallel to each other and which are connected to each other by a curved bight. The free ends of the sides are provided with clamping grooves which are open toward the bight and which are bordered on one side by adjacent low clamping groove walls. The clamping grooves serve to secure the plastics strand in a clamping manner and for shielding. The distance of the contact conductor from the opening of the insertion gap between the ends of the sides of the support rail is a multiple of the width of the insertion gap. The width of the insertion gap also essentially corresponds to the depth of the insertion gap.

Even though the known device has been found useful, it has been found particularly in practical use that the device has properties which can be improved. Improvements are especially required in the manner in which the contact conductor is secured to the inner side of the plastic strand, in the arrangement of the shielding member between the inner side of the plastic strand and the support rail, and in the positions of the shield contact surfaces without and with contact by the mobile collector.

SUMMARY OF THE INVENTION

Therefore, it is the primary object of the present invention to improve the above-described device in such a way that the manufacture as well as the assembly thereof are simplified and made less expensive.

In accordance with the present invention, the contact conductor is clamped into a longitudinal channel of the plastic strand which is bent into a circular shape. The plastic strand is locked in a positively engaging manner with outer longitudinal beads in corresponding longitudinal grooves on the inner surfaces of the ends of the sides of the support rail. When the collector shoe is not inserted, the shield contact surfaces extend in a V-shape and the longitudinal edges thereof contact each other in the center longitudinal plane of the insertion gap. With the exception of the shield contact surfaces, the shielding member is insulated relative to the inner side of the plastic strand. At the ends of the sides of the support rail are provided ledge-like projections directed toward the insertion gap. The longitudinal grooves are provided at the projections. The shield contact surfaces are supported by outer edge portions of the plastic strand and project freely movably beyond the projections at the sides of the support rail.

The placement of the contact conductor in a longitudinal channel of the plastic strand, which is particularly extruded in the flat state, provides the result that, after bending the plastic strand into a circular shape for inserting it into the support rail, the contact conductor is clamped securely between the side edges of the longitudinal channel and is aligned in the correct position. For this purpose, the longitudinal channel has a depth which is preferably three times the thickness of the contact conductor. The longitudinal edges of the longitudinal channel are rounded off.

In accordance with the invention, the shielding member may be constructed as a grating and may be particularly in the form of a metal wire mesh. With the exception of the shield contact surfaces at the ends, the shielding member can be fully and directly integrated when the plastic strand is extruded. The plastics material on both sides of the metal mesh is connected into a solid unit through the openings in the metal mesh. In this manner, the plastics material insulates the shielding member relative to the support rail. As a result, analogously to a coaxial cable, a separate energy flow of the data transmission is possible independently of the material of the support rail.

However, the screening member may also be a coating of the surface of the plastic strand which faces the support rail.

Since the shield contact surfaces project beyond the ledge-like projections of the sides of the support rail freely in a V-shape and rest against each other with their longitudinal edges in the center longitudinal plane of the insertion gap, closed shielding of the contact conductor is achieved. The shielding is only opened when the collector shoe passes through. This provides the additional advantage that the interior of the device cannot be contaminated.

Because of the fact that the plastic strand is extruded on the side facing away from the longitudinal channel with two longitudinal beads, the longitudinal beads and longitudinal grooves corresponding to the longitudinal beads make it possible in an advantageously simple manner to clamp, on the inner surface of the ends of the sides of the support rail, the plastic strand together with the integrated shielding member as well as the contact conductor clamped into the longitudinal channel.

Since the shield contact surfaces project freely movably beyond the ledge-like projections of the sides of the support rail, the shield contact surfaces can rest in the manner of joints on the projections when the collector shoe passes through and the shield contact surfaces can be swung by the collector shoe from the closed V-position into a preferably parallel open position. The specific configuration of the plastic strand with the integrated shielding member and the contact conductor placed in the longitudinal channel makes it possible to make the support rail relatively low and compact. In other words, the height of the straight sides of the support rail corresponds approximately to the radius of the curved bight portion which connects the sides. The quantity of material required is also reduced.

In accordance with a further development of the present invention, the border portions of the plastic strand supporting the shield contact surfaces are provided with longitudinally extending rounded notches in the areas facing the end faces of the projections of the sides of the support rail. As a result, the cross-section of the border portions supporting the shield contact surfaces is reduced only to such an extent that the shield contact surfaces can be swung back and forth from the closed V-position into the open parallel position without problems even when the collector shoe passes through frequently. The rounded notches prevent tearing of the border portions of the plastic strand made of a suitable material.

In accordance with another feature, the shield contact surfaces are components of border portions of the shielding member folded over by 180°. This reinforces the shield contact surfaces without impairing the swinging capability of the shield contact surfaces.

The present invention makes it possible that the support rail can be used in the form of a single section with a plastic strand clamped into the section.

In accordance with another advantageous feature, the support rail is integrated into a multiple rail strand. Consequently, two or more support rails with plastic strands clamped therein can be combined into a section, extending either parallel next to each other or in a curved relative arrangement, for example, in a U-shape. As a result, a multiple rail strand has several contact conductors for the transmission of data.

In accordance with another advantageous feature of the present invention, two support rails with plastic strands clamped therein form the ends of sides of a U-shaped bus bar made of plastics material and having a plurality of inner current conductors. Current collectors can be guided along the current conductors. For example, three current conductors arranged one above the other may be provided on both sides of the vertical longitudinal center plane of the U-shaped bus bar. Another current conductor is arranged at the bottom side of the bight of the bus bar connecting the sides thereof. Separating webs may additionally be provided between the current conductors. As a result, the downwardly projecting ends of the sides of the bus bar are now formed by support rails with contact conductors clamped therein and with plastic strands having shielding members. A plastic strand may be clamped at each end of the sides of the bus bar. However, it is also possible that a plastic strand is clamped only into one end of the sides of the bus bar.

The various features of novelty which characterize the invention are pointed out with particularity in the claims annexed to and forming a part of the disclosure.

For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is a schematic vertical sectional view of a device for digital data transmission according to the present invention;

FIG. 2 is a schematic vertical sectional view of an extruded plastic strand with contact conductor and integrated shielding member prior to mounting in the device of FIG. 1;

FIG. 5 is a partial sectional view of a multiple rail strand with a plurality of devices for digital data transmission arranged parallel next to each; and FIG. 6 is a vertical sectional view of two devices for digital data transmission as integrated components of a bus bar.

DETAILED DESCRIPTION OF THE PREFERRED EMBODIMENTS

Figure 3:
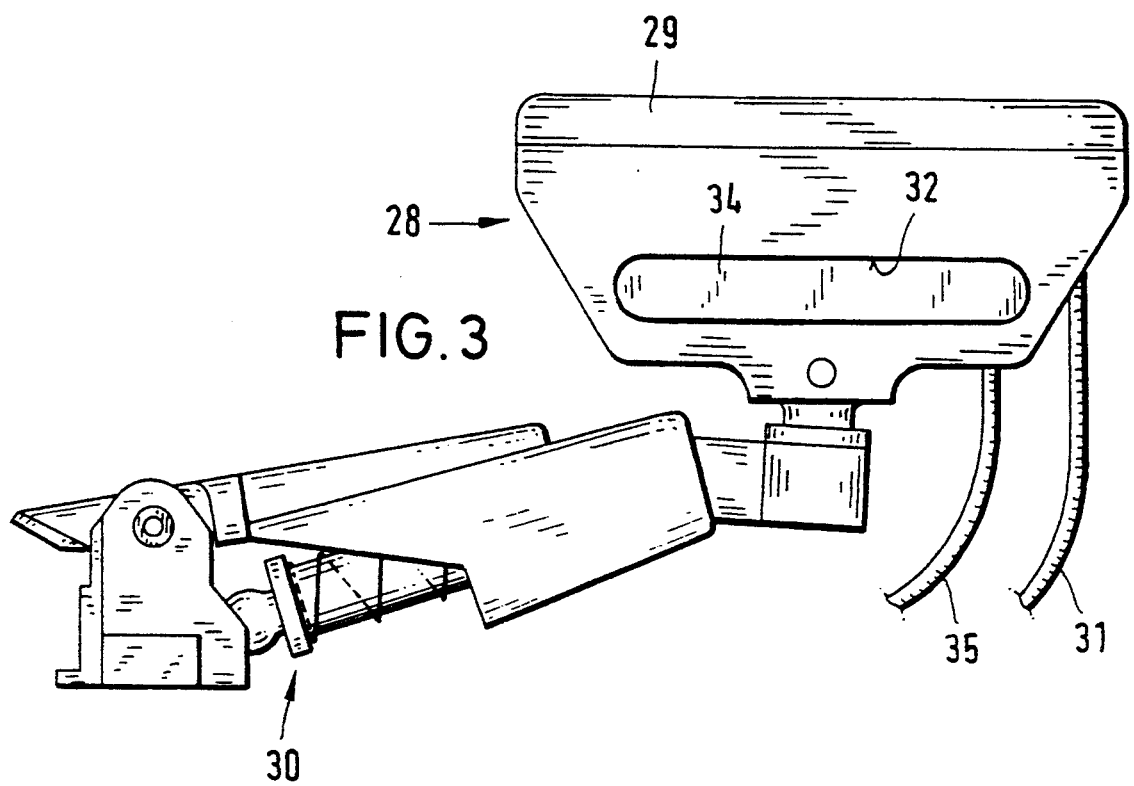
FIG. 3 is a schematic side view of a collector shoe for the device of FIG. 1.

FIG. 1 of the drawing shows a device 1 for digital data transmission according to the present invention which is preferably used in an industrial environment which is under strong electromagnetic influences.

The device 1 includes a U-shaped support rail 2 of plastics material. The support rail 2 has two sides 3 which extend parallel to each other and are integrally connected to each other through a curved bight portion 4. The height H of the sides 3 corresponds approximately to the radius R of the bight portion 4. Ledge-like projections 5 are integrally formed at the ends of the sides 3. The projections 5 extend at a right angle to the sides 3 and are directed toward each other. The end faces 6 of the projections 5 which face each other are rounded. Longitudinal grooves 9 which are round in cross-section are formed on the inner sides of the projections 5 by rounded longitudinal beads 7 and the inner surfaces 8 of the sides 3.

FIG. 2 of the drawing shows a plastic strand 10 in the flat state. As shown in FIG. 1, the plastic strand 10 is clamped in a positively engaging manner into the support rail 2. For this purpose, the plastic strand 10 has two approximately triangular longitudinal beads 11 with sides of unequal length, whose longitudinal edges 12 and transitions 13 to the plane neighboring portions 14 are rounded. When bending the plastic strand 10 in accordance with the inner contour of the support rail 2, the longitudinal beads 11 engage in a locking manner in the longitudinal grooves 9 on the inner surfaces at the ends of the sides of the support rail 2, so that the plastic strand 10 is securely positioned in the support rail 2.

When the plastic strand 10 is extruded, a metal wire mesh is integrated therein as a shielding member 15. The shielding member 15 extends over the entire width B of the plastic strand 10. The edge portions 16 of the shielding member 15 are folded over by 180°. The free ends 17 of the shielding member 15 are again secured in the material of the plastic strand 10. It is apparent that this results in shield contact surfaces 18 which are supported only on the outer side, i.e., on the side of the longitudinal beads 11, by edge portions 19 of the plastic strand 10. FIG. 2 of the drawing further shows that, with the exception of the longitudinal beads 11, the thickness D of the plastic strand 10 above the shielding member 15 is essentially uniform.

A longitudinal channel 20 is provided underneath the shielding member 15 in the middle portion of the plastic strand 10. A thin strip-like metal contact conductor 21 is placed in the longitudinal channel 20. The thickness D1 of the contact conductor 21 is significantly smaller than the average thickness D2 of the plastic strand 10 underneath the shielding member 15. In the flat extruded shape shown in FIG. 2, the width D1 of the contact conductor 21 is smaller than the width B2 of the longitudinal channel 20. The depth T of the longitudinal channel 20 is approximately three times the thickness D1 of the contact conductor 21. The transitions 22 from the side surfaces 23 of the longitudinal channel 20 to the inclined bottom surfaces 24 of the plastic strand 10 underneath the shielding member 15 are rounded.

As mentioned above, when the plastic strand 10 is bent from the flat extruded shape shown in FIG. 2 into the circular bent mounted position shown in FIG. 1, the longitudinal beads 11 engage in the longitudinal grooves 9. As a result, the plastic strand 10 adapts to the contour of the support rail 2, and the shield contact surfaces 18 assume a V-shaped configuration with the longitudinal edges 25 thereof contacting each other in the longitudinal center plane MLE of the insertion gap 26. The shield contact surfaces 18 project downwardly from the level of the ledge-like projections 5 of the sides 3. In addition, bending of the plastic strand 10 means that the bottom surfaces 24 become the inner surfaces.

As FIGS. 1 and 2 additionally show, longitudinally directed rounded notches 27 are provided in the border portion 19 of the plastic strand 10 supporting the shield contact surfaces 18 in the regions of contact with the end faces 6 of the projections 5 of the sides 3. These notches 27 facilitate swinging of the shield contact surfaces 18 and of the border portions 19 of the plastic strand 10 supporting the shield contact surfaces 18 when a collector shoe 28 passes through.

Figure 4:
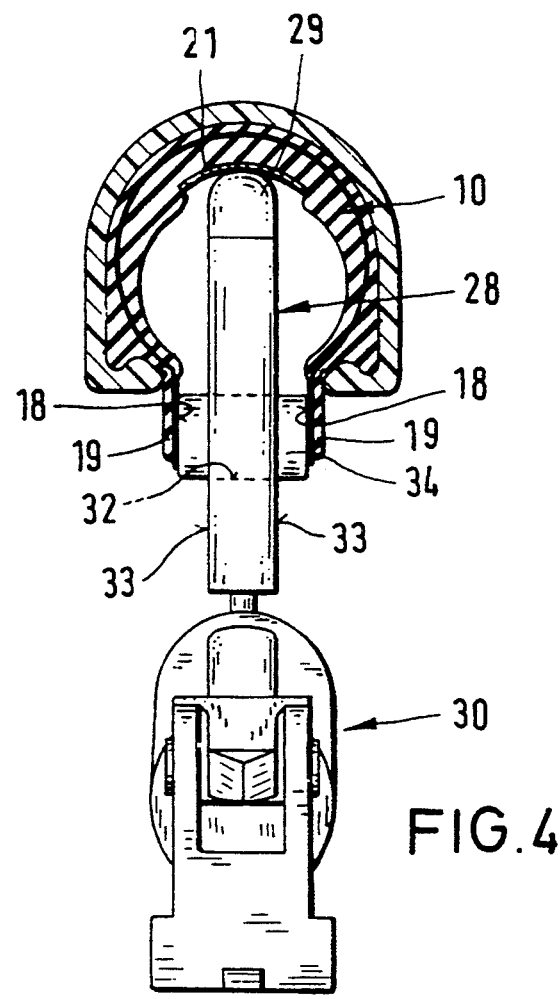
FIG. 4 is a front view, partially in section, of the collector shoe of FIG. 3 as it passes through the device of FIG. 1.

The collector shoe 28 is illustrated in detail in FIGS. 3 and 4 and is described with the aid of these FIGS. 3 and 4. As shown in the side view of FIG. 3, the collector shoe 28 which is of plastics material has a trapezoidal shape and has at the top thereof a contact body 29 in the form of a hemispherically rounded metal graphite ledge. The collector shoe 28 is hinged to a swinging lever system 30 which ensures that the contact body 29 is continuously pressed against the contact conductor 29, as shown in FIG. 4. The swinging lever system 30 is a component of a mobile unit which is otherwise not illustrated in detail.

The contact body 29 is connected through an electric cable 31 to a transmission unit, also not illustrated in detail.

FIGS. 3 and 4 of the drawing further show that a contact piece 34 of metal graphite which projects laterally beyond the side surfaces 33 of the collector shoe 32 is provided in a recess 32 of the collector shoe 28 which extends spaced apart and parallel to the contact body 29. The contact piece 34 is connected through an electric cable 35 to the transmission unit which is not illustrated.

When the collector shoe 28 passes through the device 1, the contact piece 34 swings the shield contact surfaces 18 as well as the border portions 19 of the plastic strand 10 supporting the shield contact surfaces 18 from the V-shape shown in FIG. 1 into the parallel position shown in FIG. 4. After passage of the collector shoe 28, the shield contact surfaces 18 are swung back into the V-shape position shown in FIG. 1 as a result of the restoring influence of the border portions 19 of the plastic strand 10.

FIG. 5 schematically shows an embodiment in which several devices 1 for digital data transmission are arranged parallel next to each other. For this purpose, several support rails 2' are integrated in a multiple rail strand 36 and are provided on the inner sides with plastic strands 10 which include the shielding members 15 and the contact conductors 21 and are clamped into the support rails 2'. This multiple rail strand 36 may be a flat strand or also a U-shaped curved strand. In principle, any number of devices 1 for data transmission can be provided. In the embodiment of FIG. 6, two support rails 2" with clamped-plastic strands 10, contact conductors 21 and shielding members 15 form the ends of the sides of a U-shaped bus bar 37 of plastics material. A total of seven current conductors 28 are provided inside of the bus bar 37. Current collectors, not shown in the drawing, are guided along the current conductors 38. Separating webs 39 are arranged between the current conductors 38.

The invention is not limited by the embodiments described above which are presented as examples only but can be modified in various ways within the scope of protection defined by the appended patent claims.

We claim:

1. A device for digital data transmission comprising a U-shaped support rail and a collector shoe arranged for passage through the support rail, the support rail having two sides and a bight portion connected to the sides, the sides having ends facing away from the bight portion, ledge-like projections directed toward each other being provided at the ends of the sides of the support rail, longitudinal grooves being formed between the projections and the sides of the support rail, further comprising a plastic strand having outer longitudinal beads removably clamped in a positively engaging manner into the support rail such that the outer longitudinal beads engage the longitudinal grooves of the support rail, wherein the plastic strand is essentially circular when clamped into the support rail, the plastic strand having ends and an inner surface, shield contact surfaces for contacting a contact piece of the collector shoe being provided at the ends of the plastic strand supported by outer border portions of the plastic strand, the shield contact surfaces freely projecting from the projections and being arranged in a V-shape and forming an insertion gap in a longitudinal center plane of the device, the plastic strand defining a longitudinal channel located spaced from and diametrically opposite the insertion gap, the longitudinal channel having side surfaces, a shielding member arranged in the plastic strand between the inner surface of the plastic strand and the support rail, such that, with the exception of the shield contact surfaces, the shielding member is insulated relative to the inner surface of the plastic strand, a strip-shaped metal contact conductor for contacting a contact body of the collector shoe being clamped in the longitudinal channel between the side surfaces thereof, the contact conductor having a substantially smaller thickness than the plastic strand.

2. The device according to claim 1, wherein the projections have end faces facing each other, the border portions of the plastic strand supporting the shield contact surfaces having longitudinally directed rounded notches located at the end faces.

3. The device according to claim 1, wherein the shield contact surfaces are composed of edge portions of the shielding member folded over by 180°.

4. The device according to claim 1, wherein the device is mounted in a strand having a plurality of devices for digital data transmission.

5. The device according to claim 1, wherein the device is mounted in a U-shaped bus rail of plastics material having another said device for digital data transmission and a plurality of internal current conductors.

6. The device according to claim 1, wherein the collector shoe is of plastics material and has a narrow cross-section in a transverse direction and a trapezoidally shaped cross-section in longitudinal direction of the collector shoe, the contact body comprising a hemispherically rounded ledge of metal graphite, the collector shoe having a recess extending spaced apart and parallel to the contact body, the contact piece being of metal graphite and arranged in the recess, the contact piece projecting laterally beyond side surfaces of the collector shoe.

* * * * *